(12) United States Patent
Westerkull

(10) Patent No.: US 7,376,237 B2
(45) Date of Patent: May 20, 2008

(54) VIBRATOR FOR BONE-CONDUCTION HEARING

(75) Inventor: Patrik Westerkull, Gothenburg (SE)

(73) Assignee: Oticon A/S, Smørum (DK)

( * ) Notice: Subject to any disclaimer, the term of this patent is extended or adjusted under 35 U.S.C. 154(b) by 456 days.

(21) Appl. No.: 10/932,817

(22) Filed: Sep. 2, 2004

(65) Prior Publication Data

US 2006/0045298 A1    Mar. 2, 2006

(51) Int. Cl.
*H04R 25/00* (2006.01)
(52) U.S. Cl. ............... 381/326; 381/322; 381/324; 381/151
(58) Field of Classification Search ......... 381/326, 381/322, 324, 151
See application file for complete search history.

(56) References Cited

U.S. PATENT DOCUMENTS

| | | | |
|---|---|---|---|
| 905,781 | A | 12/1908 | Baldwin |
| 3,521,208 | A | 7/1970 | Knowles |
| 5,338,287 | A * | 8/1994 | Miller et al. ............... 600/25 |
| 5,673,328 | A | 9/1997 | Wandl |
| 6,751,334 | B2 | 6/2004 | Hakansson |
| 7,319,771 | B2 * | 1/2008 | Åsnes ............... 381/326 |
| 2004/0028249 | A1 | 2/2004 | Asnes |
| 2004/0057588 | A1 | 3/2004 | Asnes |

FOREIGN PATENT DOCUMENTS

| | | |
|---|---|---|
| EP | 0 592 386 | 9/1993 |
| GB | 806428 | 12/1958 |
| WO | WO 02/093974 | 11/2002 |
| WO | WO 02/093975 | 11/2002 |
| WO | WO 03/096744 | 11/2003 |

* cited by examiner

*Primary Examiner*—Wayne Young
*Assistant Examiner*—Dionne H Pendleton
(74) *Attorney, Agent, or Firm*—Dykema Gossett PLLC

(57) ABSTRACT

The vibrator system is for generating bone conduction vibrations. A magnet (8*a*) provides a static magnetic flux ($\Phi_1$) that follows a first path. A bobbin (4*a*) is disposed at a center a vibrator (2). A housing (10) encloses the bobbin and has a coil surrounding a center of the bobbin. The coil is powered by an alternating current for providing an alternating dynamic magnetic flux ($\Phi_2$) following the first path through a magnetic circuit. The housing has an upper end (116). The upper end and the bobbin have a first gap (14*a*) formed therebetween. The housing has a lower end (118) opposite the upper end. The lower end and the bobbin have a second gap (14*b*) formed therebetween. The magnet is positioned so that the static magnetic flux ($\Phi_1$) is passing through the first and second gaps in a direction substantially parallel with an axial direction (A) of the vibrator. Suspension means (16*a*, 16*b*) are provided for suspending the bobbin in a center of the housing.

10 Claims, 7 Drawing Sheets

VIBRATOR FOR BONE-CONDUCTION HEARING

TECHNICAL FIELD

The present invention relates to a vibrator for generating audio vibrations for providing bone-conduction hearing.

BACKGROUND OF THE INVENTION

Bone conduction is the principle of transmitting vibrations via the skull bone to the inner ear, i.e. the cochlea. Several different types of bone conduction hearing aids are available. The two most common types of such hearing aids are the traditional bone conductors and the direct bone conductors. The traditional bone conductor consists of a hearing aid with a vibrator that is pressed against the skull. The vibrations are then transmitted through the skin and the skull bone into the cochlea. The direct-bone conductors include an anchoring component that is attached to the skull bone and through which the vibrations are directly transmitted to the skull bone.

All of such devices require a vibrator where the electrical signal is converted and transferred into mechanical vibrations. Preferably, electromagnetic vibrators are used in these applications. There are several drawbacks with a traditional non-balanced variable reluctance vibrator. One drawback is that there is a static strong magnetic force biasing to collapse the air gap. The strong static magnetic flux is required as a biasing flux to get a sufficient linearity of the vibrator. To prevent the magnetic force from collapsing the air gap the suspension spring constantly has to counteract the magnetic force. Due to the constantly high load on the suspension spring there is a significant risk for a collapse of the air gap. If a stiffer spring is used, the low frequency response of the vibrator is reduced, which is not desirable. The low frequency response may in that case be improved by adding mass to the vibrator, however this makes it bigger which is not desirable. This design also presents a built-in distortion component that reduces the sound quality of the vibrator.

In some suggested designs, the armature is balanced so that the static force on the suspension elements is minimized and the static and the dynamic magnetic fluxes go partly separated through the magnetic circuit. This may lead to some advantages in the magnetic circuit, however it leads to a complex design that is expensive to manufacture.

In some designs more than two air gaps are required or there has to be at least two magnets in the design. Since each air gap need to be quite small to get an efficient design each air gap requires high precision of the mechanical and magnetic components, and it is therefore a significant drawback to have more air gaps than necessary. By using air gaps with magnetic forces perpendicular to the axial direction in the vibrator there is a risk of the air gap collapsing also in this direction in addition to the risk of the air gap collapsing in the axial direction. Small high precision magnets as those required for this kind of vibrators are costly both to purchase and to handle and makes the design complex. It is therefore desirable to keep down the number of magnets. Also the coils are difficult to handle and it is also desirable to keep down the number of coils.

SUMMARY OF THE INVENTION

The vibrator of the present invention provides an effective solution to the above-outlined problems. The vibrator of the present invention has a balanced armature that makes it possible to use softer cushions/springs that can offer a lower resonance frequency without adding weight to the vibrator. The vibrator of the present invention has better durability compared to conventional vibrators because they exert a continuous load on the cushions or springs and require stiffer cushions.

More particularly, the vibrator system of the present invention is for generating bone-conduction vibrations. A magnet provides a static magnetic flux ($\Phi_1$) that follows a first path. A bobbin is disposed at a center of a vibrator. A housing encloses the bobbin. The vibrator has a coil surrounding a center of the bobbin. The electromagnetic coil is powered by an alternating current for providing an alternating dynamic magnetic flux ($\Phi_2$) following the first path through a magnetic circuit. The housing has an upper end. The upper end and the bobbin have a first gap formed therebetween. The housing has a lower end opposite the upper end. The lower end and the bobbin have a second gap formed therebetween. The magnet is positioned so that the static magnetic flux ($\Phi_1$) is passing through the first and second gaps in a direction substantially parallel with an axial direction (A) of the vibrator. Suspension means are provided for suspending the bobbin in a centered position inside the housing.

The bone-conduction vibrator system of the present invention is a balanced electromagnetic vibrator where the static and the magnetic flux follow the same way through the magnetic circuit and where only one magnet and one coil is needed. The vibrator has a bobbin positioned in the center of the vibrator inside the vibrator housing.

The fact that the vibrator is balanced results in less harmonic distortion compared to non-balanced vibrators. Compared to current balanced transducers, the vibrator system of the present invention is significantly less expensive to manufacture. The vibrator system of the present invention has one single magnet and one coil that makes it simple and cost efficient to manufacture. The small-sized magnets used in the vibrators are very difficult to handle in the manufacturing and the coils are sensitive and require wiring for its connection.

In the present invention, the magnet is preferably placed in the central axial plane and the magnet is preferably magnetized in the axial direction. With the central axial plane is meant a plane perpendicular to the axial direction that goes through the center of the vibrator.

The magnet may be placed either in the center of the bobbin or in the central axial plane in the vibrator housing. For both these magnet positions the mechanical components on each side of the magnet become symmetrical and therefore less expensive to manufacture. The symmetry of the vibrator is preferably circular but may also have another symmetry such as having a quadratic shape.

There are two separate air gaps for the magnetic flux between the bobbin and the housing. One of the air gaps is positioned at one of the axial ends of the bobbin and the other air gap is positioned at the other opposite axial end of the bobbin. The flux of the magnetic fields passes through these single two air gaps in a direction that may be substantially parallel to the axial direction. In the vibrator system of the present invention preferably there are no air gaps with strong magnetic forces in a direction perpendicular to the axial direction, which could lead to instability in a direction perpendicular to the axial direction that is not desirable.

In a preferred embodiment of the vibrator system, the coil is fixed to the bobbin that may be a cost efficient and space saving design. Since there are wires connecting the coil and the electronics outside the vibrator there might be wear and tear on these wires. Therefore, another preferred embodiment describes a design where the coil is attached to the vibrator housing which may offer reduced wear on the wires going to the coil.

In a yet preferred embodiment of the present invention, the suspension of the bobbin is arranged by suspension cushions placed between the bobbin and the vibrator housing. These cushions can also be designed with a radial contact surface that is in radial contact with the bobbin to keep the bobbin centered in the vibrator housing in the radial direction. In another preferred embodiment, the suspension cushions are manufactured by an elastic material with damping properties to damp the resonance frequency of the vibrator. An alternative embodiment is to have a suspension cushion with for example an elastic material such as rubber or silicone on its mantle surface and a damping material inside. In this way, the elastic spring material and the damping material can be optimized separately for its purpose. With an elastic material is meant a material that is mechanically mainly acting as a spring. With a damping material is meant a material that is mechanically mainly acting as a shock absorber.

In another preferred embodiment, the bobbin is suspended in at least one suspension spring positioned outside the vibrator housing. Such a spring can preferably include damping material to damp the resonance frequency of the vibrator.

The magnet can preferably be made of a sintered magnetic material so that a small and thin magnet can generate a high magnetic field. By keeping the magnets thin in the present invention, an improved magnetic conductivity for the dynamic magnetic field generated by the coil can be achieved. This is due to the fact that permanent magnets have a low relative permeability. A high magnetic conductivity for the dynamic field contributes to improve the efficiency of the vibrator. To further increase the magnetic conductivity for the dynamic flux through the magnet, the area of the magnet in the axial plane could be increased. In this way, the magnet can to some extent also be made thinner. The soft iron that is in contact with the magnet should be in full contact with the magnet but can then be reduced in its dimensions within quite short distances away from the magnet. In case the magnet is mounted in the vibrator housing the magnet can preferably have a circumference that is at least 2 mm greater than the circumference of the distal ends of the vibrator housing. The circumference is here used to specify this dimension since the symmetry of the components might be other than circular. In case of a circular geometry, the outer diameter of the magnet and the distal ends of the housing could be used to specify this dimension and in that case this could be expressed as if π×Diameter of the magnet should be at least 2 mm greater than π×Diameter of the distal ends of the housing since the circumference of a circle is specifically π×Diameter.

When the magnet is mounted in the center of the bobbin, the magnet and the part of the bobbin closest to the magnet may have a circumference that is at least 2 mm greater than the smallest circumference of the bobbin.

DETAILED DESCRIPTION

Figure 1:
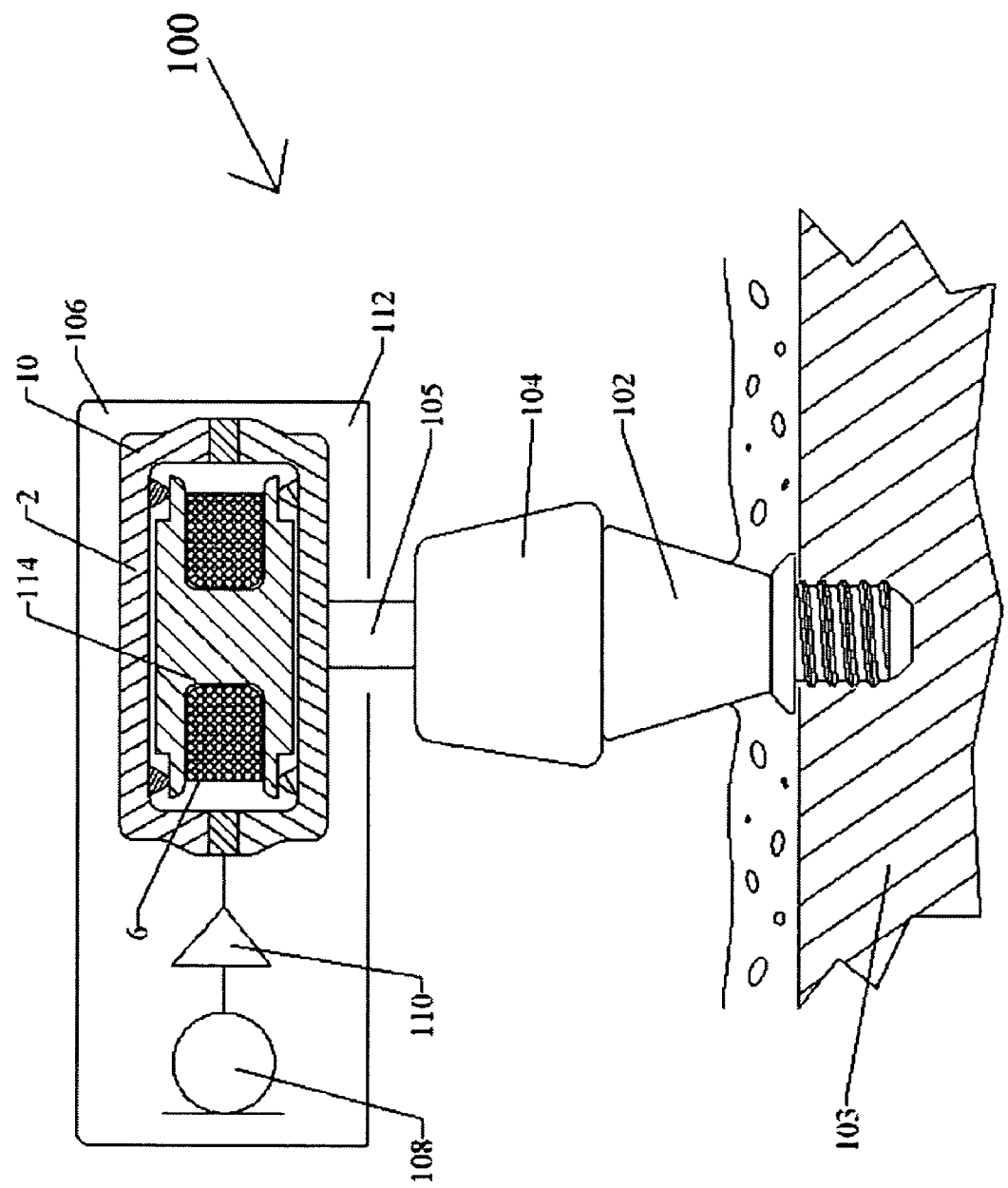
FIG. 1 is a cross-sectional top view of the present invention built into an example of a bone conduction hearing system that is a direct bone conduction hearing aid.

FIG. 1 is a cross-sectional top view of an illustrative example of a hearing system 100 that has an abutment 102 with a screw that is screwed into a skull 103 of a user. A coupling 104 is in operative engagement with and removably attached to the abutment 102. A hearing aid device 106 has an elongate member or axle 105 that is connected to the coupling 104. The elongate member 105 extends through a housing 112 of the device 106 and is directly connected to a housing 10 of a variable reluctance vibrator 2. It may also be possible to connect the bobbin directly to the elongate member 105. The device 106 includes a microphone 108 connected to an amplifier 110 that, in turn, is connected to the vibrator 2. Sound is picked up by the microphone 108 and converted to electric signals and transferred via the amplifier 110 to the vibrator 2. As described in detail below, the electric signals creates the dynamic and alternating electromagnetism of the coil 6 that causes the vibrator 2 to vibrate. These vibrations are transferred via the connector 104 and abutment 102 into the inner ear disposed inside the skull 103.

Figure 2:
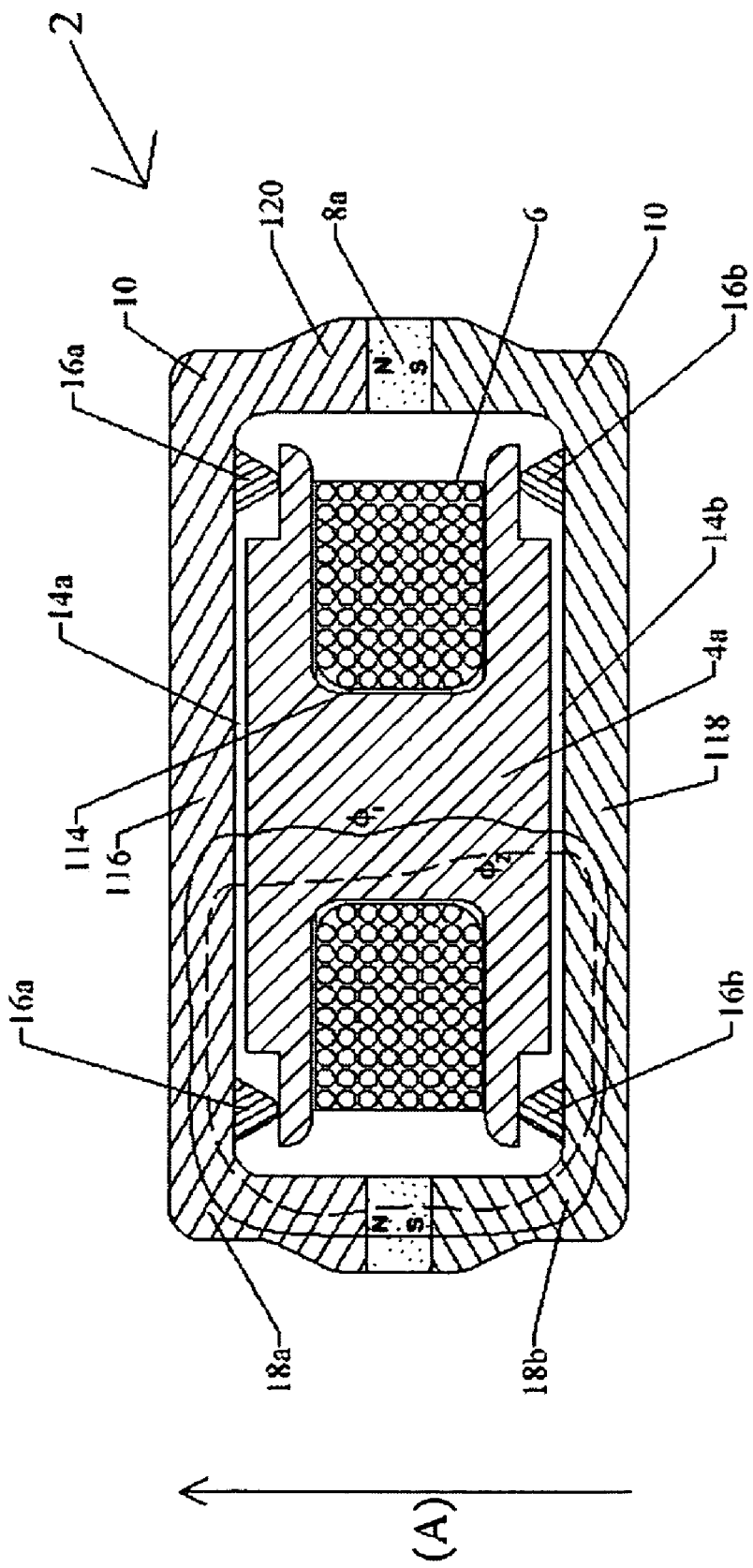
FIG. 2 is a cross-sectional side view of a preferred first embodiment of the vibrator of the present invention.

FIG. 2 is a cross-sectional detailed side view of a preferred embodiment of the vibrator 2 of the present invention. Preferably, all of the vibrator components shown have circular geometry. A vibratable bobbin 4a has the coil 6 wound around a central cavity portion 114 thereof. The bobbin 4a is in operative engagement with a vibrator housing 10 via elastic cushions 16a, 16b that are attached to an inside wall of the housing 10. A circular permanent magnet 8a is placed in the vibrator housing 10. The magnet 8a is preferably positioned at a mid-section 120 of the wall of the housing 10 that has a thicker wall thickness. In this way, the magnet 8a and the mid-section 120 of the housing 10 closest to the magnet 8a have a greater circumference compared to distal ends 18a, 18b of an upper segment 116 and a lower segment 118 of the housing 10. By increasing the wall thickness at the mid-section 120, the magnet 8a may be made thinner but wider. As described above, it is desirable to make the magnet 8a as thin as possible since magnets often have poor magnetic permeability.

The bobbin 4a and the housing 10 are preferably made of soft iron or any other suitable material with good magnetic permeability. The arrow (A) represents an axial direction. The magnet 8a may be magnetized in the axial direction. Air gaps 14a, 14b, respectively are formed between the upper and lower ends of the bobbin 4a and the housing 10. In this way, the bobbin 4a is suspended in the elastic circular cushions 16a, 16b so that the bobbin 4a may vibrate relative to the housing 10. The cushions may provide several properties such elastic or damping properties or a combination of properties.

A static magnetic flux ($\Phi_1$) is generated by the magnet 8a. The path of the magnetic flux ($\Phi_1$) through the magnetic circuit is marked as a dotted line in FIG. 2. A dynamic magnetic flux ($\Phi_2$) is generated by an electric alternating current going through the coil 6. The coil 6 may include one or more windings depending on, for example, which kind of amplifier is used to drive the coil 6. Preferably, the static magnetic flux is preferably greater than the dynamic magnetic flux.

The path of the electro-generated or dynamic magnetic flux ($\Phi_2$) through the magnetic circuit is marked as a dashed line in FIG. 2. Because the dynamic magnetic flux is generated by the alternating current, the direction of the dynamic magnetic flux alternates between the upper segment 116 and the lower segment 118 of the housing 10 so that the upper segment 116 may attract the bobbin 4a more while the lower segment 118 attracts the bobbin 4a less. When the current alternates, the upper segment 116 attracts the bobbin 4a less while the lower segment 118 attracts the bobbin 4a more. In this way, the dynamic flux ($\Phi_2$) causes the bobbin 4a to vibrate in relation to the housing 10 by the alternating magnetic forces generated by the dynamic magnetic flux in the air gaps 14a, 14b.

Figure 3:
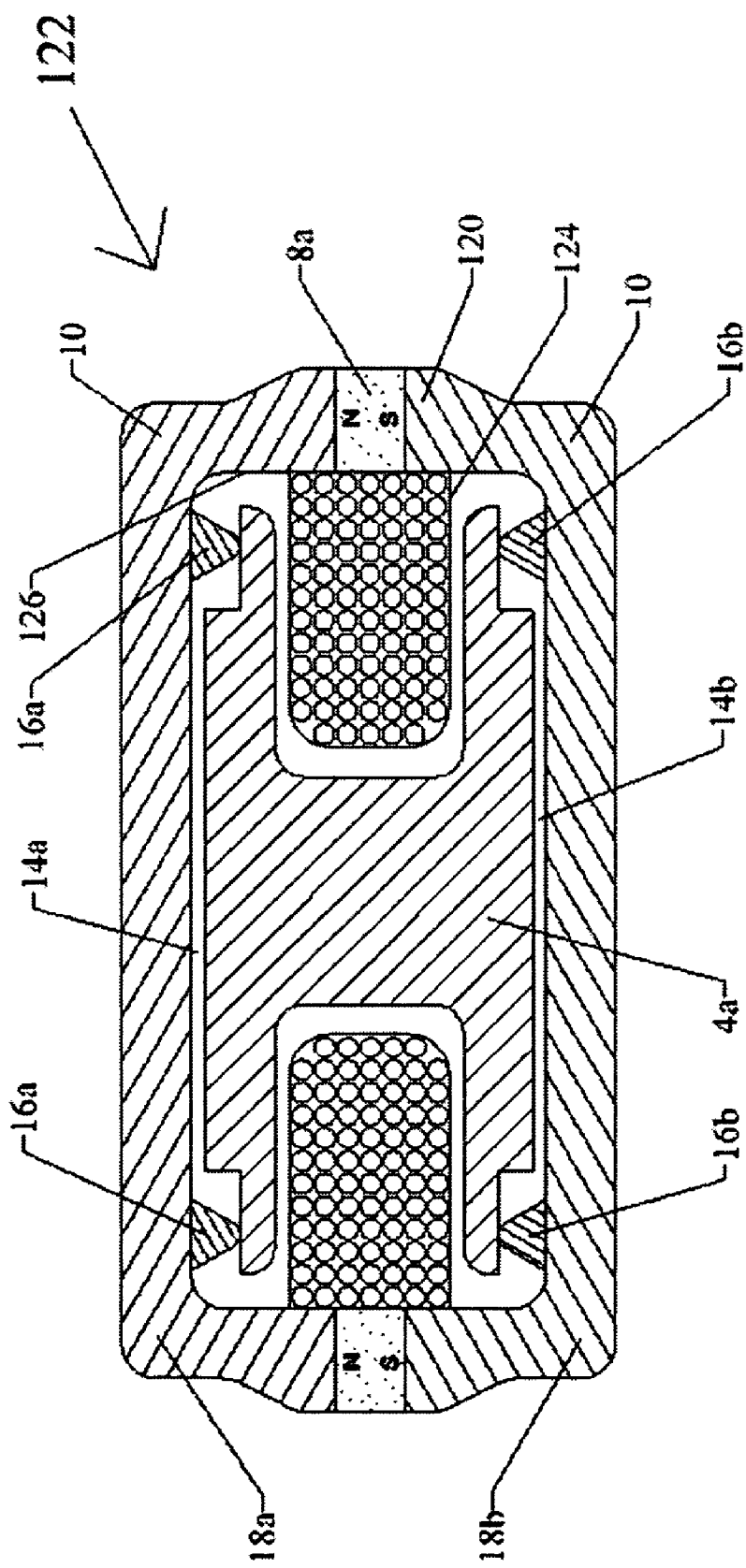
FIG. 3 is a cross-sectional side view of a second embodiment of the vibrator where the coil is fixated to the vibrator housing.

FIG. 3 is a cross-sectional side view of a second embodiment of a vibrator 122 that is similar the vibrator 2 of FIG. 2. The vibrator 122 has a coil 124 that is fixedly attached to an inner wall 126 of the housing 10 at the mid-section 120 thereof. In this way, the coil 124 does not vibrate as much as the bobbin 4a so that the wires to the coil are not subject to vibration to extend the durability of the wires and the coil.

Figure 4:
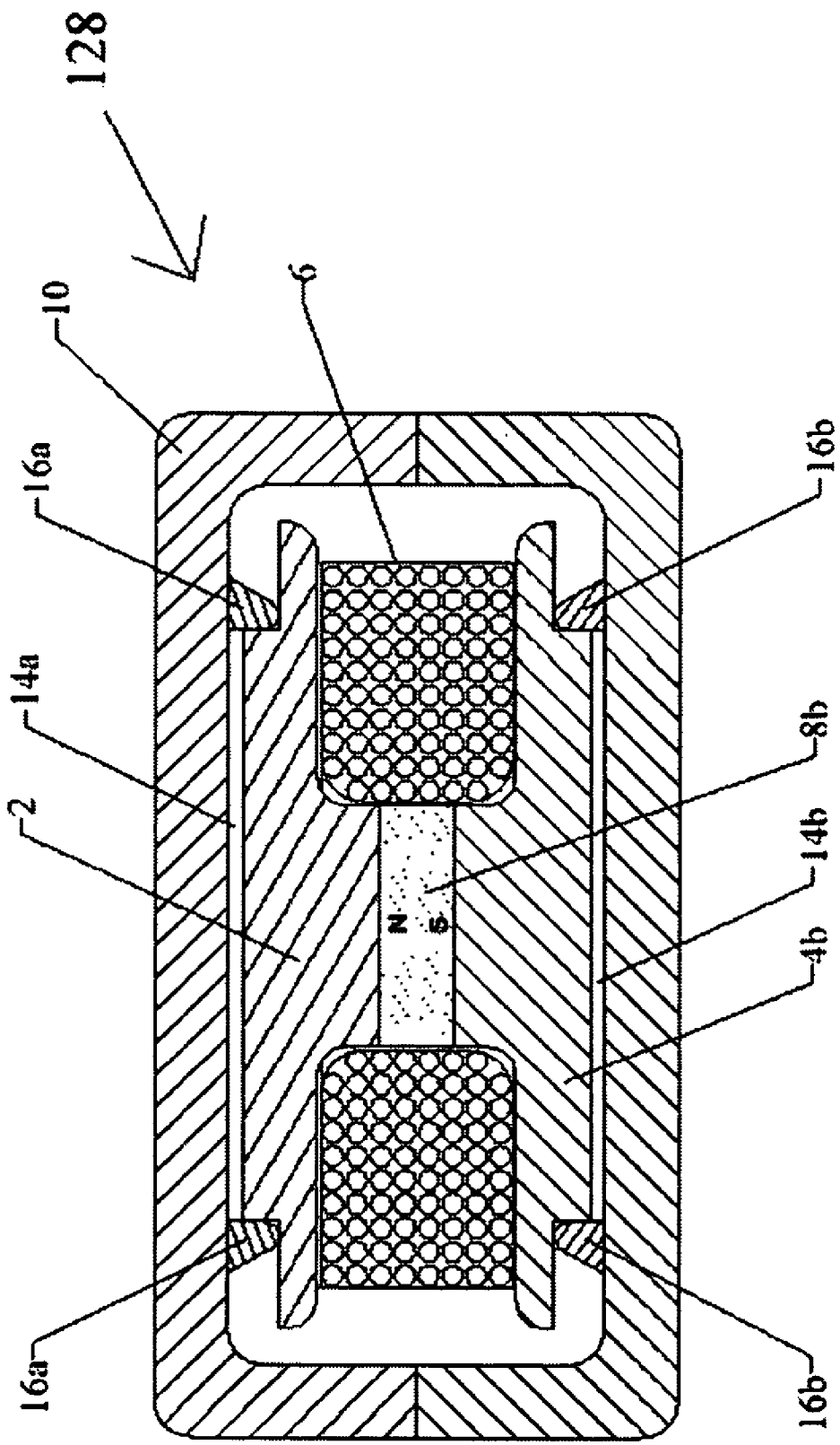
FIG. 4 is a cross-sectional side view of a third embodiment of the vibrator where the magnet is placed in the center of the bobbin.

FIG. 4 shows a preferred third embodiment of a vibrator 128 that has a permanent magnet 8b that is placed in a center of a bobbin 4b and inside the circular coil 6.

Figure 5:
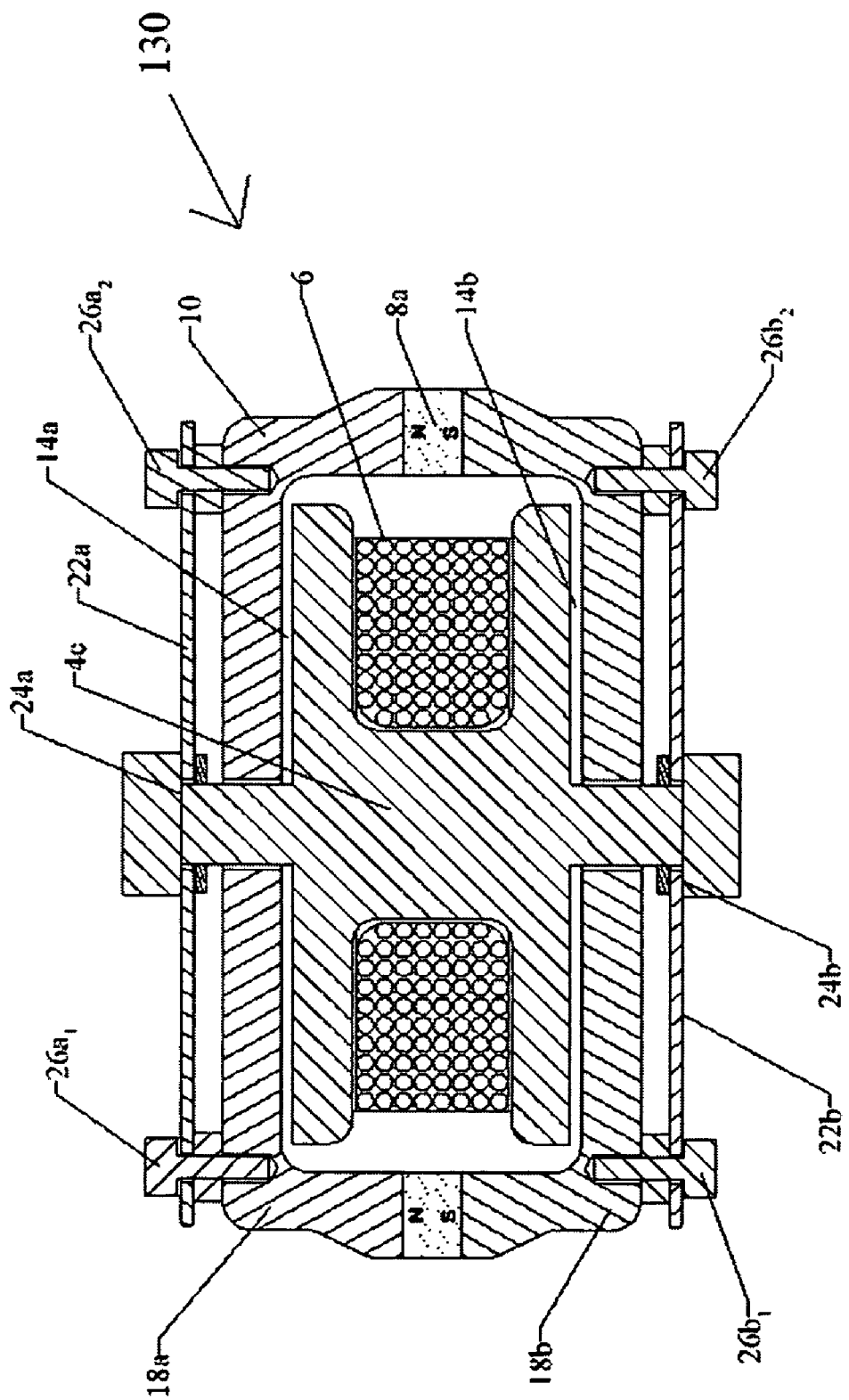
FIG. 5 is a cross-sectional side view of a fourth embodiment of the vibrator where the suspension of the bobbin consists of suspension springs outside the vibrator housing.

FIG. 5 is a cross-sectional side view of a preferred fourth embodiment of a vibrator 130 where the suspension of a bobbin 4c is carried out by two springs 22a, 22b that are placed outside a vibrator housing 132. The two springs 22a, 22b are secured to the housing with fixation screws $26a_1$, $26a_2$, $26b_1$, $26b_2$ and secured to the bobbin 4c in the fixation fittings 24a, 24b. The bobbin 4c is vibrating against the biasing forces of the springs 22a, 22b.

Figure 6:
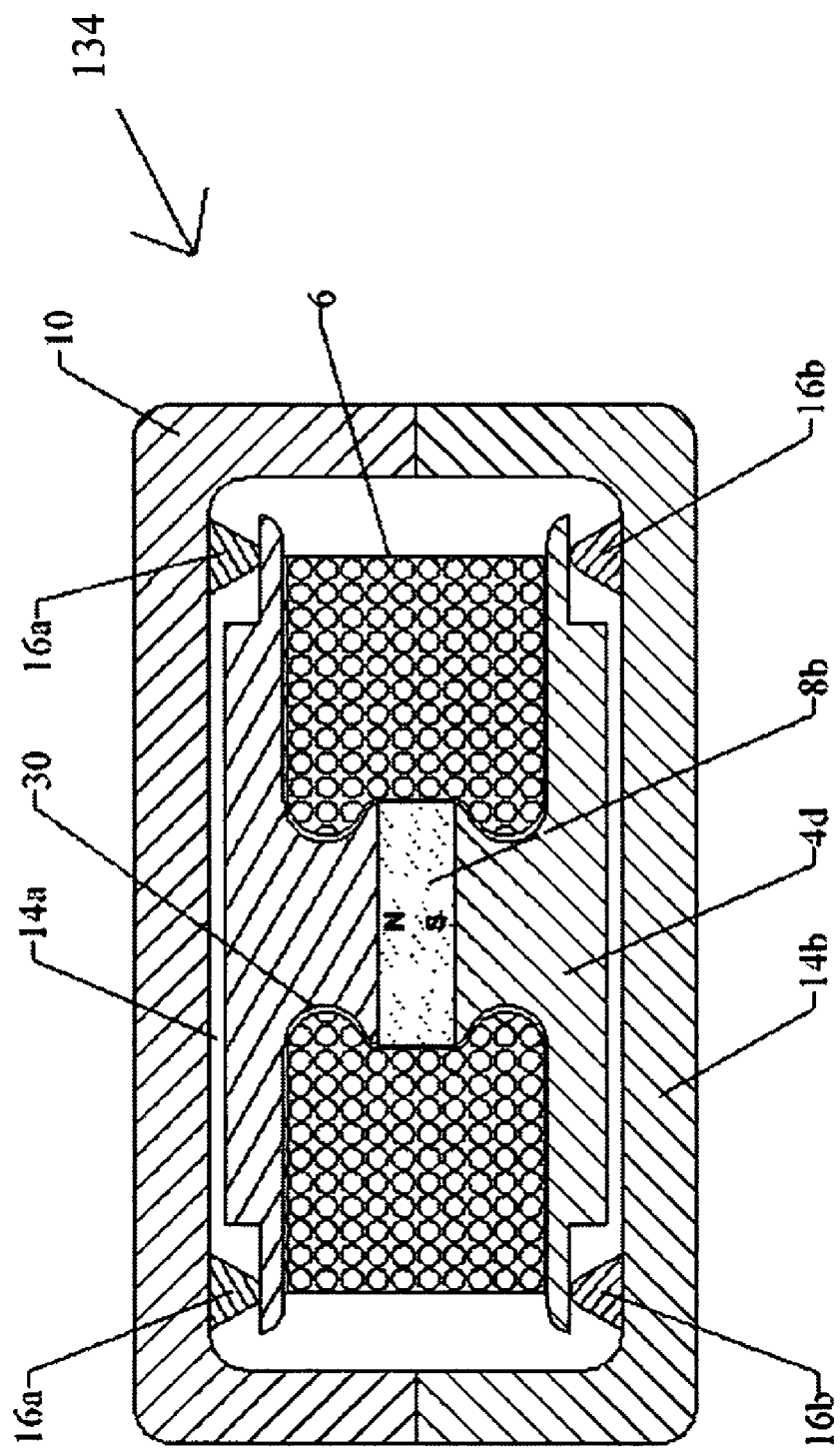
FIG. 6 is a cross-sectional side view of a fifth embodiment of the vibrator where the magnet is placed in the center of the bobbin and where the circumference of the magnet is greater than the smallest circumference of the bobbin.
Figure 7:
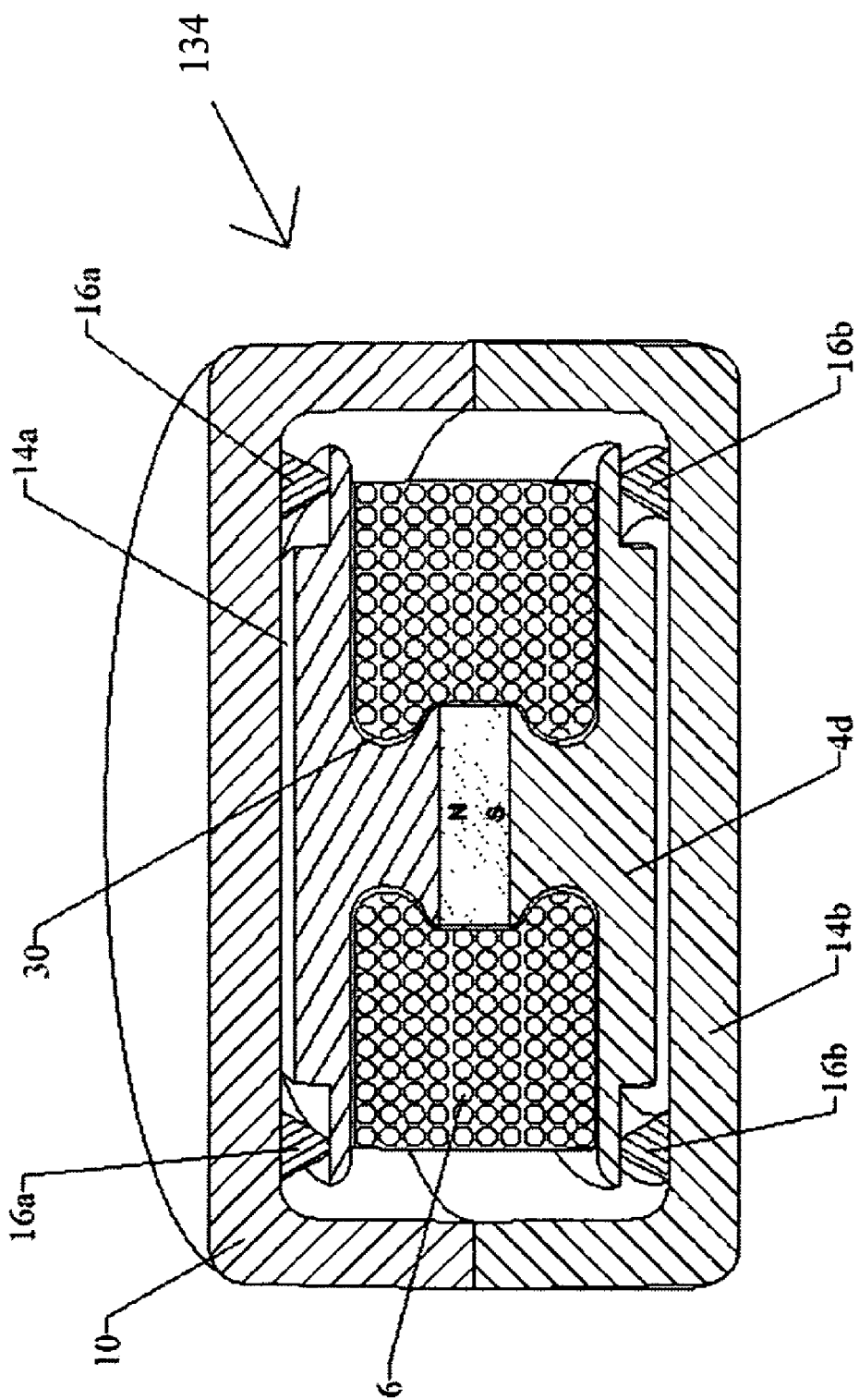
FIG. 7 is a perspective cross-sectional view of the fifth embodiment shown in FIG. 6.

FIGS. 6-7 are cross-sectional views of a preferred fifth embodiment of the vibrator 134 where the magnet 8b is placed in the center of the bobbin 4b and where the magnet 8b is significantly wider than a narrowest portion 30 of the bobbin 4d.

In operation, the coil produces the alternating dynamic magnetic flux that alternatingly changes the direction of the magnetic flux. In a first flux direction, the upper segment 116 attracts the bobbin more and the lower segment 118 attracts the bobbin less while in a second opposite flux direction, the upper segment 116 attracts the bobbin less and the lower segment 118 attracts the bobbin more. By alternating the current and thus alternating the direction of the dynamic magnetic flux ($\Phi_2$) the bobbin vibrates back and forth in axial direction. Because the cushions are preferably elastic the bobbin may vibrate relative to the housing although the bobbin is in operative engagement or attached to the cushions 16a and 16b. The vibrations from the bobbin and the housing are conveyed by the elongate member 105 through the coupling 104 and abutment 102 into the skull 103 of the user. In this way, the sound waves may be transferred from the microphone 108 into the inner ear disposed inside the skull 103.

For all of the above embodiments several alternative designs and combinations are possible and the invention is not limited to the preferred embodiments presented above. While the present invention has been described in accordance with preferred compositions and embodiments, it is to be understood that certain substitutions and alterations may be made thereto without departing from the spirit and scope of the following claims.

The invention claimed is:

1. A vibrator system for generating bone conduction vibrations, comprising:
    a housing having a magnet in a wall thereof and a vibrator disposed therein, the magnet providing a static magnetic flux ($\Phi_1$) following a first path;
    a bobbin being centered in the vibrator;
    the housing enclosing the bobbin, the housing having a coil wound around a center portions of the bobbin, the coil being powered by an alternating current for providing an alternating dynamic magnetic flux ($\Phi_2$) substantially following the first path through a magnetic circuit;
    the housing having an upper end, the upper end and the bobbin having a first gap formed therebetween;
    the housing having a lower end opposite the upper end, the lower end and the bobbin having a second gap formed therebetween;
    the static magnetic flux ($\Phi_1$) is passing through the first and second gaps in a direction substantially parallel with an axial direction (A) of the vibrator; the static magnetic flux ($\Phi_1$) is not passing through any other gaps than the first and second gaps; and
    suspension means for suspending the bobbin in a centered position inside the housing.

2. The vibrator system according to claim 1, wherein the bobbin is substantially symmetrical in relation to an axial central plane of the vibrator.

3. The vibrator system according to claim 1, wherein the coil is secured to the bobbin.

4. The vibrator system according to claim 1, wherein the magnet is placed in the housing in an axial central plane of the vibrator.

5. The vibrator system according to claim 1, wherein the housing has a mid-section that has a circumference that is greater than a circumference of distal ends and the magnet is attached to the mid-section.

6. The vibrator system according to claim 1, wherein the bobbin is suspended in the vibrator housing with a suspension cushion.

7. The vibrator system according to claim 1, wherein the dynamic magnetic flux ($\Phi_2$) is switchable to flow in a first direction and a second opposite direction.

8. The vibrator system according to claim 7, wherein the first direction is the same as a magnetic flow direction of the static magnetic flux ($\Phi_1$).

9. The vibrator system according to claim 7, wherein the second direction is opposite a magnetic flow direction of the static magnetic flux ($\Phi_1$).

10. The vibrator system according to claim 1, wherein the bobbin is suspended in a suspension spring positioned outside the housing.

* * * * *